(12) United States Patent  
Rauch et al.

(10) Patent No.: US 6,575,427 B1
(45) Date of Patent: *Jun. 10, 2003

(54) ELECTRONIC THROTTLE CONTROL MECHANISM WITH REDUCED FRICTION AND WEAR

(75) Inventors: James Richard Rauch, Grass Lake; Mark Warner Semeyn, Jr., Ypsilanti; Ross Dykstra Pursifull, Dearborn, all of MI (US)

(73) Assignee: Visteon Global Technologies, Inc., Dearborn, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/610,413

(22) Filed: Jul. 5, 2000

Related U.S. Application Data

(63) Continuation-in-part of application No. 09/438,122, filed on Mar. 10, 1999, now Pat. No. 6,173,939.

(51) Int. Cl.[7] .............................. F02D 11/10; F16K 1/22
(52) U.S. Cl. .................... 251/69; 251/129.12; 251/285; 123/339.15; 123/399
(58) Field of Search ...................... 251/129.12, 129.11, 251/285, 69; 123/339.15, 396, 399

(56) References Cited

U.S. PATENT DOCUMENTS

| 4,237,742 A | 12/1980 | Barthruff |
| 5,035,218 A | 7/1991 | Takeuchi |
| 5,040,508 A | 8/1991 | Watanabe |
| 5,092,296 A | 3/1992 | Gunter et al. |
| 5,201,291 A | 4/1993 | Katoh et al. |
| 5,301,646 A | 4/1994 | Doi et al. |
| 5,452,697 A | 9/1995 | Sasaki et al. |
| 5,490,487 A | 2/1996 | Kato et al. |
| 5,562,081 A | 10/1996 | Hitchcock |
| 5,664,542 A | 9/1997 | Kanazawa et al. |
| 5,718,202 A | 2/1998 | Bentz et al. |
| 5,752,484 A | * 5/1998 | Apel et al. .................. 123/396 |
| 5,868,114 A | 2/1999 | Kamimura et al. |
| 5,934,250 A | 8/1999 | Fujikawa et al. |
| 5,975,051 A | * 11/1999 | Yamada et al. ............. 123/396 |
| 6,039,027 A | * 3/2000 | Sato et al. .................. 123/399 |
| 6,050,241 A | * 4/2000 | Reiling ........................ 123/396 |
| 6,070,852 A | * 6/2000 | McDonnell et al. ... 251/129.11 |
| 6,095,488 A | * 8/2000 | Semeyn, Jr. et al. .... 251/129.12 |
| 6,129,071 A | * 10/2000 | Pursifull ................ 123/339.15 |
| 6,173,939 B1 | * 1/2001 | Dottavio et al. ........ 251/129.12 |

* cited by examiner

Primary Examiner—Lesley D. Morris
Assistant Examiner—Eric Keasel
(74) Attorney, Agent, or Firm—John Kajander, Esq.

(57) ABSTRACT

An electronic throttle control system having a housing and cover member with a throttle valve, gear mechanism, motor, and failsafe mechanism. A spring member positioned between the housing and sector gear member which is attached to the throttle valve shaft, biases the throttle valve plate member toward the closed position. A spring-biased plunger member biases the throttle plate member from its closed position to a default or "limp-home" position. A stop shoulder on the sector gear is transverse to the longitudinal axis of the plunger mechanism midway through the default range of travel of the sector gear and plunger member. This reduces stresses on the components and minimizes friction and wear on the gear train mechanism.

6 Claims, 5 Drawing Sheets

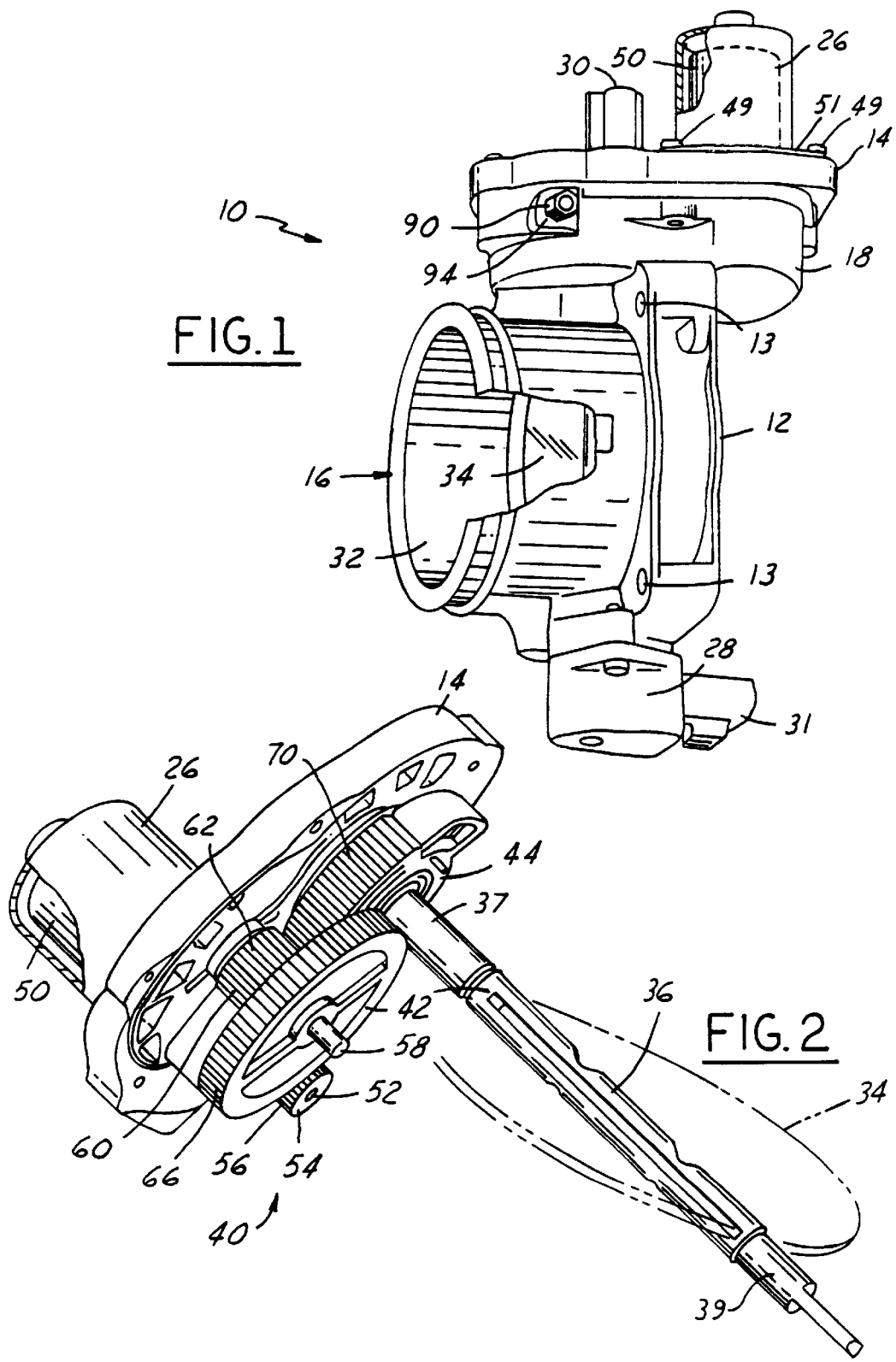

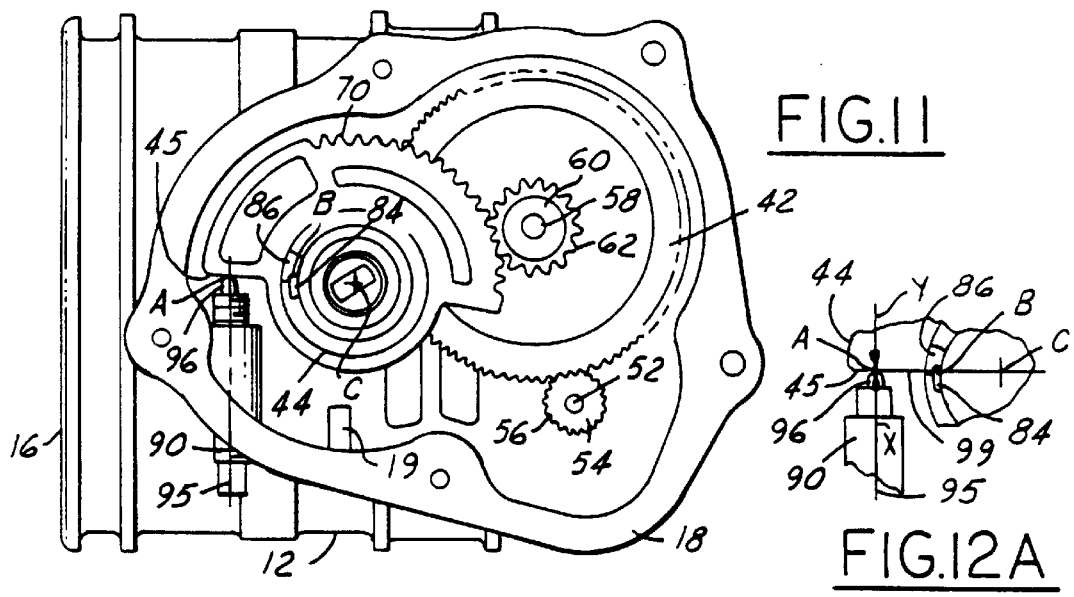
FIG.11
FIG.12A
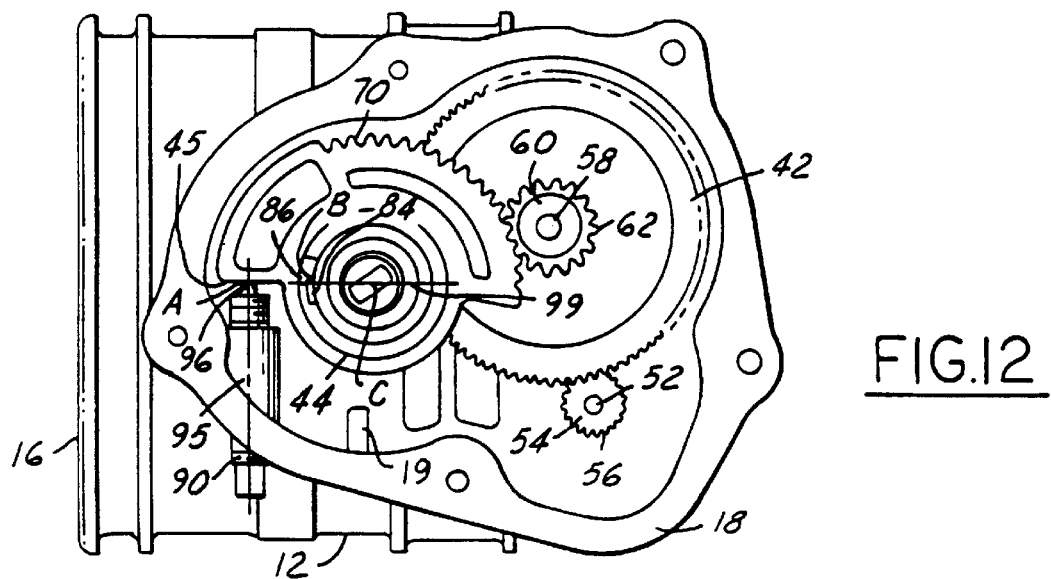
FIG.12
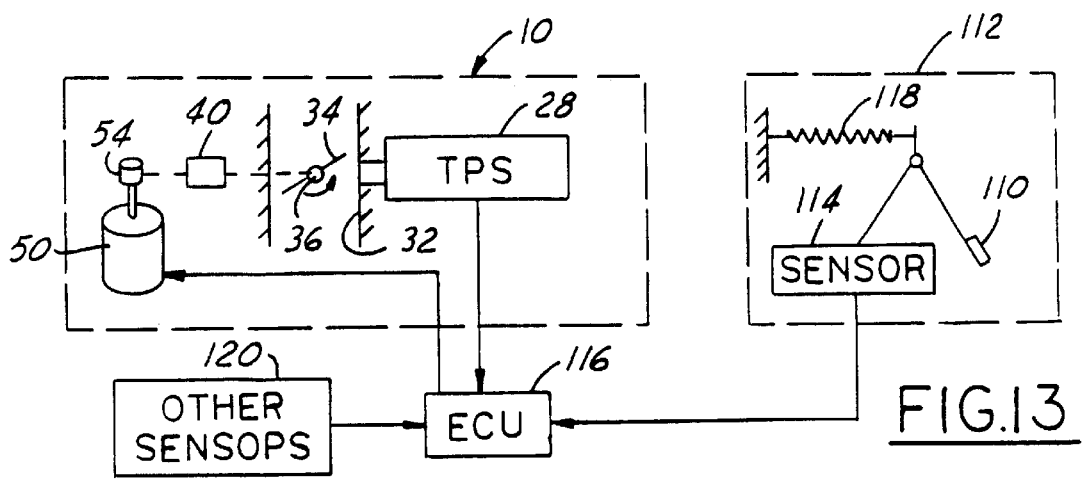
FIG.13

ELECTRONIC THROTTLE CONTROL MECHANISM WITH REDUCED FRICTION AND WEAR

CROSS-REFERENCE TO RELATED APPLICATIONS

This present application is a continuation-in-part of U.S. patent application Ser. No. 09/438,122, filed Mar. 10, 1999, now U.S. Pat. No. 6,173,939 B1.

TECHNICAL FIELD

This invention relates to electronic valve control systems and more particularly to electronic throttle control systems for internal combustion engines with gear mechanisms having reduced friction and wear.

BACKGROUND

Valve assemblies for engines and related systems typically utilize rotatable valve members in fluid flow passageways to assist in regulating fluid flow through them. For example, throttle valve members are positioned in the air induction passageways in internal combustion engines. The valve assemblies are controlled either mechanically or electronically and utilize a mechanism which directly operates the valve member.

For electronic throttle control systems, it is desirable to have a failsafe mechanism or system which activates the throttle valve in the event that the electronic control or electronic system of the vehicle fails. There are several known electronic throttle control systems which utilize failsafe mechanisms for closing the throttle valve or moving it to a slightly open position in the event of an electronic failure in the vehicle. One of these systems is shown, for example, in the Applicant's co-pending patent application Ser. No. 09/438,122, filed Nov. 10, 1999, (FGT 199-0418), the disclosure which is hereby incorporated by reference herein.

It would be desirable to have an electronic valve control system with an improved failsafe or limp-home mechanism and which optimizes the operation and positions of the gear mechanism and gear components in order to minimize friction and wear.

SUMMARY OF THE INVENTION

The present invention provides an electronic throttle control assembly having a housing with a gear train and throttle valve mechanism. A throttle plate is positioned on a throttle shaft and the plate and shaft are positioned in the engine or air induction passageway, such that the throttle plate regulates airflow into the engine. A cover member enclosing the gear train contains a motor with a spur gear.

The operation of the throttle valve is accomplished through the gear train assembly which is driven by the motor. The motor is regulated by the electronic control unit of the vehicle which in turn is responsive to the input of the vehicle operator or driver. A throttle position sensor responsive to the rotation of the throttle shaft feeds back the position of the throttle plate to the electronic control unit.

In the operation of the throttle valve, a gear connected to the motor operates an intermediate gear (or idler gear), which in turn operates a sector gear which is connected to the throttle body shaft. The sector gear is biased by a spring member toward the closed position of the throttle valve. As a failsafe mechanism, a spring-biased plunger member is attached to the housing and positioned to interrupt operation of the sector gear in the event of an electronic failure and prevent the throttle valve from closing completely. At the failsafe position, the vehicle can still be operated, although at a reduced capacity. This allows the driver to "limp-home."

If the throttle valve is in its closed position when an electronic failure occurs, the spring-biased plunger member acts on the sector gear to open the throttle valve slightly to the failsafe position.

In order to minimize friction and wear on the sector gear which are created by contact of the gear with the plunger member of the default mechanism, the components are positioned such that the activation surface of the sector gear is perpendicular to the longitudinal axis of the plunger member at a position approximately midway in the default range of travel of the plunger and sector gear. This minimizes the sliding contact and friction between the plunger member and sector gear surface and as a result reduces friction and enhances performance of the default mechanism. This also reduces wear on the sector gear which is typically constructed of a composite material.

Other features and advantages of the present invention will become apparent from the following description of the invention, particularly when viewed in accordance with the accompanying drawings and appended claims.

BRIEF DESCRIPTION OF THE DRAWINGS

FIG. 1 illustrates an electronic throttle control assembly in accordance with the present invention;

FIG. 2 illustrates the cover member of an electronic throttle control assembly with the gear train and throttle shaft attached thereto;

FIGS. 9, 10, 11 and 12 illustrate various positions of the sector gear and plunger mechanism during operation of the electronic throttle control assembly in accordance with the present invention;

FIG. 12A is an enlarged view showing the forces X and Y, points A, B and C, axis 95 and alignment line 99 more clearly; and FIG. 13 is a schematic illustration showing a representative circuit which can be utilized with the present invention.

DESCRIPTION OF THE PREFERRED EMBODIMENT(S)

Figure 3:
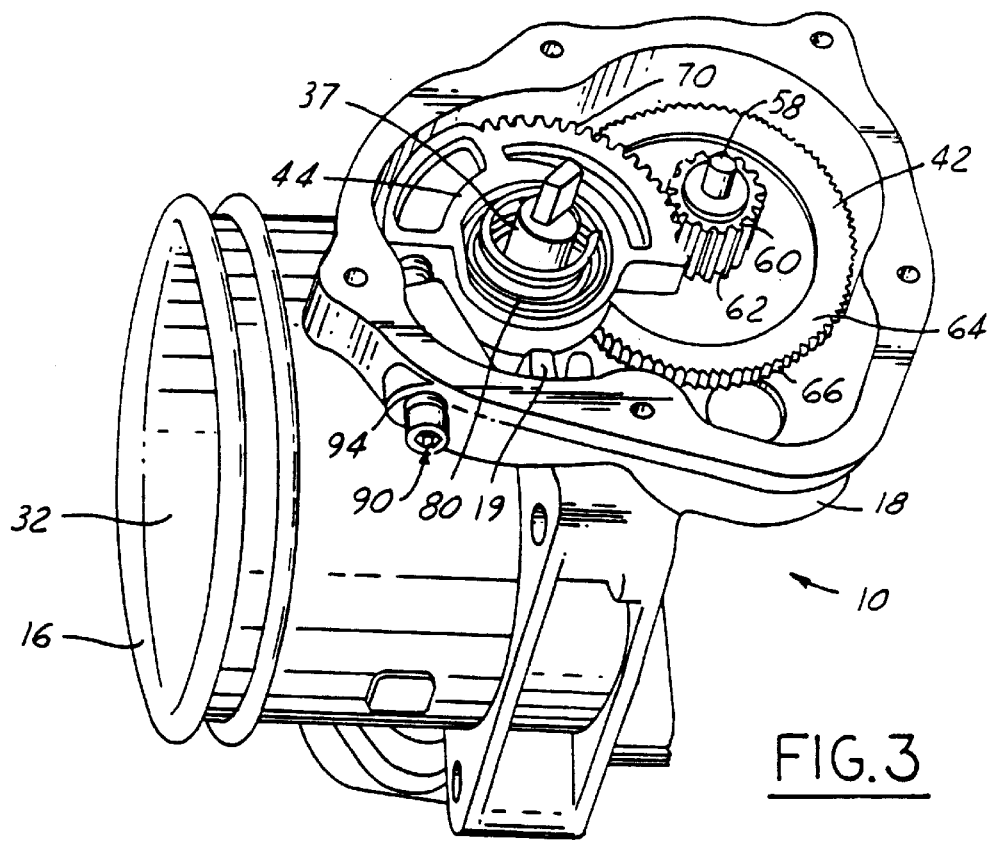
FIG. 3 is a top view of an electronic throttle control housing showing the gear mechanism.

The drawings illustrate a preferred embodiment of an electronic throttle control assembly in accordance with the present invention. It is understood that other embodiments with alternate configurations and equivalent components and operations can be utilized in accordance with the present invention.

FIG. 1 is a perspective view of an electronic throttle control assembly or mechanism which is referred to generally by the reference numeral 10. The electronic throttle control assembly 10 includes a housing or body member 12 and a cover member 14. The housing 12 includes a throttle valve section 16, a gear train section 18, and a throttle position sensor mechanism 28. The cover member includes a motor housing 26 and an electrical connector member 30.

Figure 4:
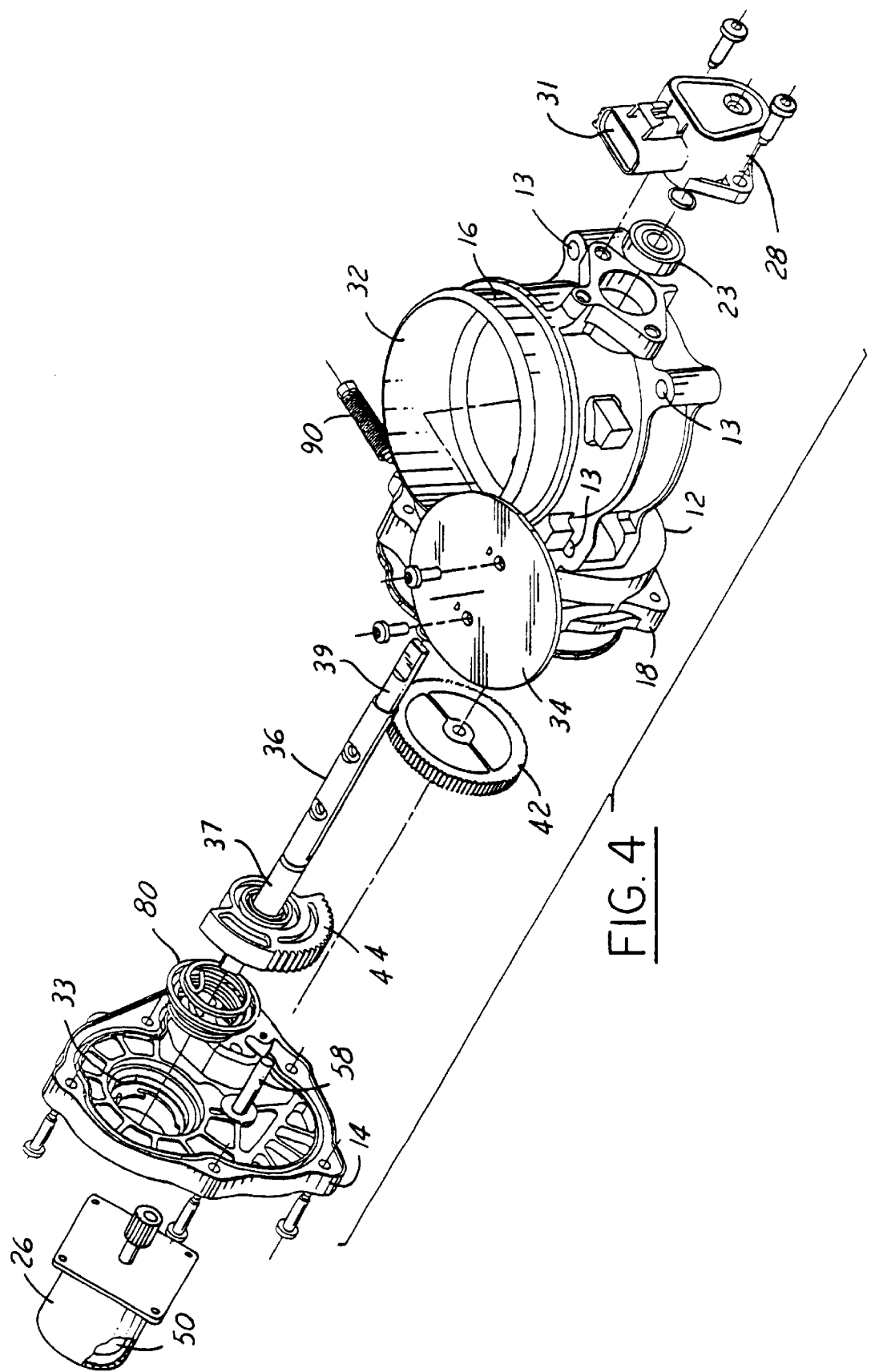
FIG. 4 is an exploded side sectional view of the electronic throttle control mechanism of FIG. 1 showing many of the components thereof.

The throttle valve section 16 includes an air flow passageway 32 in which a valve plate 34 is positioned to regulate the flow of air therethrough. The throttle plate 34 is attached to a throttle shaft 36 which is positioned transverse to the axis of the airflow passageway 32. The throttle shaft is positioned in the housing 12 in any conventional manner and preferably is supported by a pair of bearings 23 (one of which is shown in FIG. 4) which allow it to turn freely to regulate the airflow to the engine.

A gear train or mechanism 40 is positioned in the gear train section 18 of the housing member 12. The gear train 40 generally consists of an intermediate or idler gear member 42 and a sector gear member 44. The sector gear 44 is fixedly attached to the upper end 37 of the throttle shaft 36 such that the throttle shaft and throttle plate rotate along with the sector gear.

Figure 5:
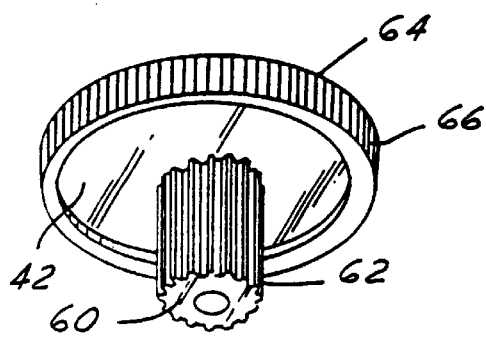
FIG. 5 depicts an intermediate or idler gear member which can be utilized with the present invention.
Figure 6:
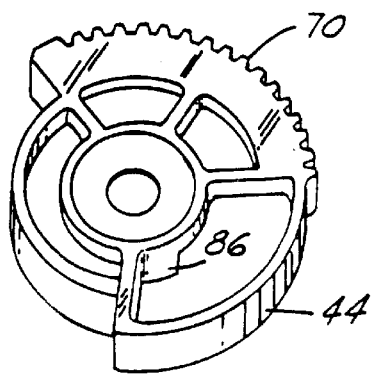
FIG. 6 illustrates a sector gear member which can be utilized with the present invention.

A motor 50 is positioned in the motor housing 26 and attached to the cover member 14. The motor 50 is preferably a reversible 13-volt DC motor and is connected to a mounting plate 51 which is secured to the cover member 14 by a plurality of fasteners 49. The motor 50 has a shaft 52 on which a small spur gear 54 is positioned. The gear 54 has a plurality of teeth 56 which mesh with and rotate the gear train. The idler gear member 42 is mounted on a shaft 58 which is positioned in the housing 12 or cover member 14, or both. The idler gear rotates freely on the shaft 58. As shown in FIG. 5, the intermediate or idler gear 42 includes a first gear member portion 60 with a plurality of teeth 62 and a second gear member portion 64 with a plurality of teeth 66. The gear teeth 66 are positioned to mesh with the gear teeth 56 on the motor driven gear 54, while the gear teeth 62 are positioned and adapted for mating with gear teeth 70 on the sector gear 44. As shown in the drawings, the teeth 70 on sector gear 44 are only provided on a portion or sector on the outer circumference of the gear member.

All of the gear members 54, 42 and 44 are preferably made of a plastic material, such as nylon, although they can be made of any other comparable material, such as a composite material, which has equivalent durability and function.

The sector gear 44 is preferably molded onto one end 37 of the throttle shaft 36. For this purpose, recesses or grooves are provided on the end 37 of the shaft in order to allow the sector gear to be integrally molded to the shaft and be permanently affixed to it.

Figure 7:
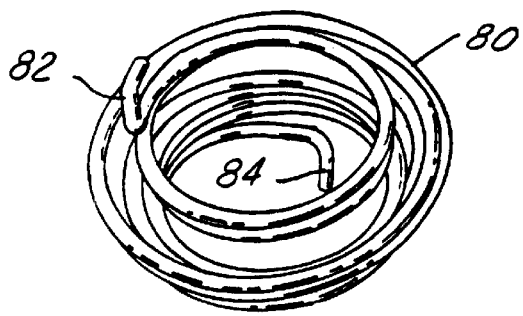
FIG. 7 illustrates an embodiment of a spring member which can be utilized with the present invention.

A helical torsion spring member 80 is positioned in the gear train section 18 of the housing member 12. One embodiment of a spring member 80 which can be utilized with the present invention is shown in FIG. 7. The spring member 80 has one end 82 which is fixedly secured to the cover member 14 while the other end 84 of the spring member is positioned in opening 86 in the sector gear 44. In the embodiment illustrated in the drawings, the spring member 80 is positioned around the end 37 of the throttle shaft and between the sector gear 44 and the cover member 14 (see FIG. 3).

Figure 8:
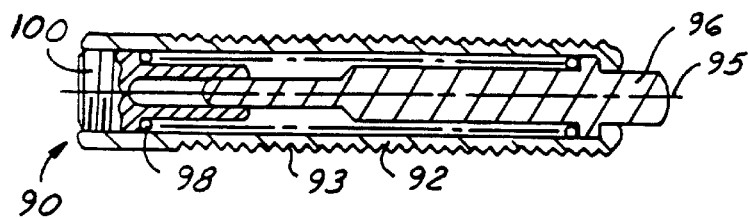
FIG. 8 illustrates a spring-biased plunger member which can be utilized with the present invention.

The spring-biased plunger mechanism which is preferably utilized with the present invention is shown in FIG. 8 and identified generally by the reference numeral 90. The plunger member 90 has an elongated hollow body or housing 92 which is threaded to mate with threaded opening 94 in the gear train section 18 of the housing 12. A slideable plunger member 96 is positioned at one end of the plunger member 90 and is biased by a spring member 98 positioned inside the housing 92. A plug member 100 holds the spring member and plunger member 96 in position. Threads 93 on the outer surface of the body 92 of the plunger mechanism 90 mate with corresponding threads in opening 94 in housing 12 so that the plunger mechanism can be adjusted to facilitate proper and optimum positioning and operation of the throttle valve and failsafe mechanism.

The spring-biased plunger mechanism 90, in combination with sector gear 44 and spring member 80, act together to limit and control the operation of the valve plate 34 in the failsafe mechanism. In this regard, the general operation of the gear assembly, sector gear, plunger member, and the other components are described in detail in the Applicant's co-pending patent application Ser. No. 09/438,122, filed on Nov. 11, 1999, and entitled Electronic Throttle Control System With Two-Spring Failsafe Mechanism (FGT 199-0418), the disclosure which is hereby incorporated by reference herein.

The operation of the electronic throttle valve assembly is shown generally by the schematic diagram set forth in FIG. 13. In general, the force applied to the accelerator pedal 110 by the operator of the vehicle 112 is read by a sensor 114 and conveyed to the electronic control unit (ECU) 116 of the vehicle. The accelerator pedal 110 is typically biased by a spring-type biasing member 118 in order to provide tactile feedback to the operator. The ECU 116 of the vehicle also receives input from a plurality of other sensors 120 connected to other mechanisms and systems in the vehicle.

In order to operate the throttle valve plate 34, a signal from the ECU 116 is sent to the motor 50. The motor rotates the spur gear 54 which then operates the gear train mechanism 40. More specifically, the spur gear member 54 rotates the intermediate or idler gear member 42 which, in turn, rotates the sector gear member 44. This, in turn, causes the throttle body shaft 36, which is fixedly attached to the sector gear member 44, to rotate. Rotation of the shaft 36 accurately positions the valve plate 34 in the passageway 32 and allows the requisite and necessary airflow into the engine in response to movement of the accelerator pedal 110.

The cover member 14 can be attached to the body or housing member 12 in any conventional manner, but preferably is connected by a plurality of fastener members, such as screws or bolts. Also, an appropriate gasket or sealing member (not shown) can be positioned between the cover member and the housing in order to protect the gear train 40 and other components from dirt, moisture, and other environment conditions. When the electronic throttle control assembly 10 is utilized, it is positioned in the engine compartment of the vehicle and bolted or otherwise securely fastened to the vehicle. For this purpose, a plurality of openings can be provided in the housing, such as openings 13 shown in FIG. 1.

The throttle position sensor (TPS) 28 is secured to the housing 12. The TPS is of conventional design and has a rotor which is attached to the lower end 39 of the throttle shaft 36. The TPS 28, together with related electronics, reads or "senses" the position of the throttle valve 34 and transmits it to the ECU 116 of the vehicle. An electrical connector 31 connects the TPS to the ECU. The connector member 31 preferably has four contacts and, through the ECU regulates the actions of the motor 50 and thus the position of the throttle valve.

Connector 30 on the cover member 14 connects the motor 50 to the ECU. Opening 33 in the cover member allows access to the upper end 37 of the throttle shaft during assembly of the throttle valve assembly and orientation/calibration of the throttle shaft and throttle valve.

Preferably, the cover member 14 is made from a plastic composite material, such as fiberglass filled polyphenyl sulfide (PES) or polyetherimide (PEI). In order to reinforce the cover member, a metal plate member (not shown) can be molded into the cover when it is manufactured. The metal plate stiffens the cover member, holds the motor securely in position, and can maintain the center-to-center spacing of the gear members and shaft members. Also, preferably the various components of the electronic throttle valve assembly 10 are packaged and positioned in the manner shown in FIGS. 1–4 for ease of positioning and use in the vehicle, although other configurations are possible. For example, TPS can be positioned on the cover member 14 and be connected to the upper end of the throttle shaft, and the connector 30 can include the electrical connections for both the motor and the TPS.

The housing member 12 can be made of a metal material, such as aluminum, or it can also be made of a plastic composite material. Also, preferably the cover member motor, gear train, spring member, throttle shaft and gear shaft 58 are preassembled into a modular subassembly before they are mated with the housing.

When the electronic throttle control mechanism 10 is assembled, the spring member 80 biases the valve plate member 34 towards its closed position. In this regard, in many engines known today, the throttle plate is manufactured and assembled to have a slight inclination on the order of 7°–10° in the fully closed position. This is to assure proper functioning of the valve plate in all conditions and prevent it from sticking or binding in the closed position. In this regard, typically the airflow passageway 32 has a circular cross-sectional shape and configuration, while the throttle plate member 34 has a slightly elliptical shape.

Figure 9:
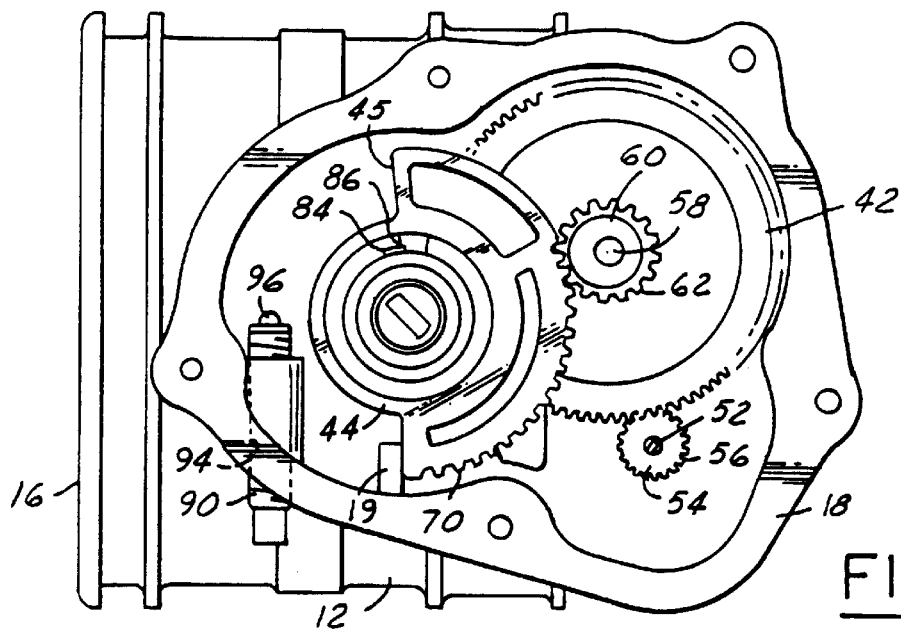

Due to the bias of spring member 80 on the sector gear 44 and thus valve plate member 34, the spring member 80 acts to return the throttle plate 34 to or toward the closed position in the event of an electronic failure of the electronic throttle control mechanism 10 or the vehicle itself. In this regard, the throttle plate member 34 and sector gear 44 can be rotated by the motor 50 and gear train mechanism 40 to the fully open position of the throttle plate 34. In the open position, the throttle plate member 34 is positioned approximately parallel to the axis of the air flow passageway 32 thus allowing a full complement of air to pass into the engine. FIG. 9 illustrates the position of the sector gear and plunger mechanism when the throttle valve member 34 is in its wide open position. Stop member 19 in the housing 18 limits the throttle valve from opening past the fully open position.

The plunger mechanism 90 acts as a failsafe mechanism which prevents the throttle valve from closing completely in the event of an electronic failure. The plunger mechanism 90 acts to position the throttle valve plate 34 in a slightly open position, thus allowing the vehicle to operate at a reduced speed and "limp-home." In this regard, since throttle plate assemblies in engines known today have a slight inclination on the order of 7°–10° in the fully closed position, the default or "limp-home" position of the throttle plate in these engines is about 12°–20° from a position transverse to the axis of the airflow passageway.

The plunger mechanism 90 is positioned in the housing 12 such that the spring biased plunger member 96 contacts shoulder member or surface 45 on the sector gear 44. The plunger mechanism 90 is positioned such that the shoulder 45 contacts plunger member 96 before the throttle plate 34 reaches the fully closed position. The force or bias of the spring member 98 in the plunger mechanism 90 is stronger or greater than the force or bias of the helical torsion spring member 80, and thus the plunger mechanism 90 stops and prevents the sector gear 44 from rotating any further. The position of the sector gear and plunger mechanism at this point of operation is shown in FIG. 11.

Figure 10:
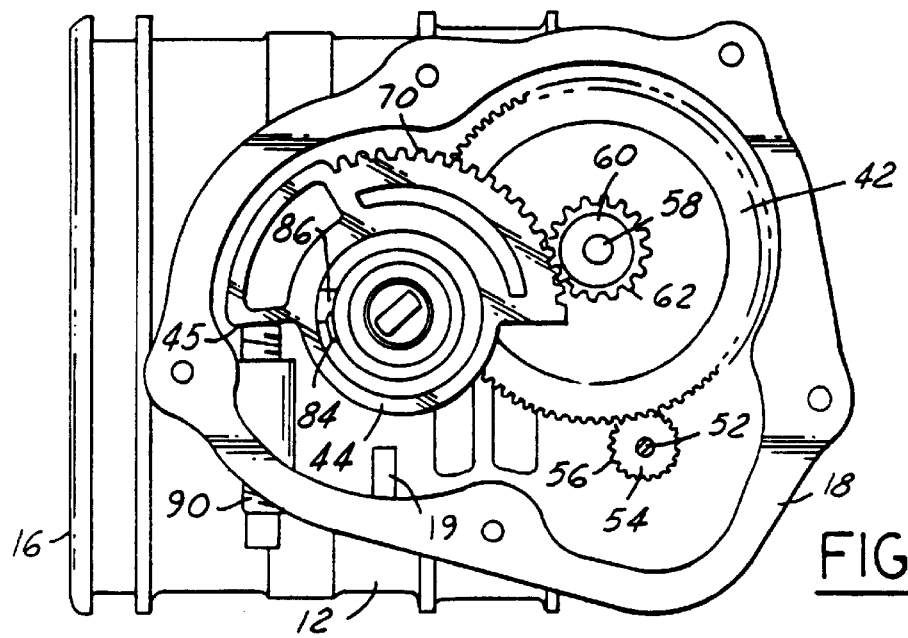

In order to overcome the force of the spring member 98 and allow the throttle plate member 34 to be moved to its fully closed position, the motor 50 is operated. The motor, through the gear train mechanism 40, turns or rotates the sector gear 44 which, in turn, rotates the throttle shaft and closes the valve plate member 34. The motor forces the stop shoulder 45 against the plunger member 96 and moves the plunger member to a depressed position against the force of the spring member 98. FIG. 10 illustrates the position of the components when the throttle valve member is in its closed position.

In the event of an electronic failure in a throttle control assembly 10 when the throttle plate member is closed or almost closed, the failsafe mechanism will automatically act to open the throttle plate to the default or "limp-home" position. The force of the spring biasing member 98 on the plunger member will return the plunger member to its undepressed position, thus forcing the sector gear member 44 (and throttle shaft member 36) to rotate slightly and open the throttle valve member 34 (see FIG. 11). With the use of two spring members 80 and 98, the throttle shaft member 36 (and thus the throttle valve plate member 34) is biased in all directions of operation of the throttle control valve system toward the default or limp-home position.

By strategically selecting the geometry of the position of the sector gear 44 and plunger mechanism 90, wear, friction and stresses in the gear train mechanism 40 can be minimized. The reduction of stresses and concentration of forces reduces deflection of the gear members which increases the durability and useful use of the electronic throttle control assembly 10.

Whenever the stop shoulder 45 of the sector gear 44 and the plunger member 96 of the plunger mechanism 90 are in contact, as shown in FIGS. 10–12A, a force X is applied to the stop shoulder surface 45 of the sector gear. In addition, the torsion spring member 80 exerts a force Y on the sector gear 44 in the direction opposite to the force of the plunger member. These forces are shown in FIG. 12A.

In accordance with the present invention, the forces X and Y are strategically applied to the sector gear and plunger member such that stresses and normal forces in the sector gear are significantly reduced. In this regard, point A, which is the point of contact between the plunger member 96 and stop shoulder 45 of the sector gear, point B, which is the point of contact of the end 84 of the spring member 80 in the opening 86 on of the sector gear, and point C, which is the center of rotation or axis of the sector gear 44, are in alignment. Preferably, points A, B and C are aligned along a line 99 which is perpendicular to the longitudinal axis 95 of the plunger mechanism 90 when the plunger member 96 is approximately midway in the default range of travel of the sector gear and plunger member 96 (see FIG. 12A). As shown in the drawings, this means that the sector gear 44 and plunger member 96 are in the position shown in FIG. 12 which is midway between the positions of the sector gear and plunger members shown in FIGS. 10 and 11. Having these surfaces perpendicular midway through the default range of travel instead of at either end of the travel range minimizes the sliding contact and friction between the plunger member 96 and sector gear surface 45. This reduces friction in the operation of the electronic throttle control assembly 10 and enhances its performance. This also reduces wear on the sector gear which is preferably constructed of a composite material.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. An electronic valve control assembly with a failsafe mechanism comprising:

a housing having an air flow passageway;

a gear train positioned in the housing and having a first gear member and a second gear member;

said first and second gear members in mesh with each other, and said first gear member having a stop shoulder thereon;

a motor positioned in the housing and having a third gear member, said third gear member being in mesh with said second gear member;

a throttle shaft member positioned in said housing and connected to said first gear member and rotatable therewith;

a throttle valve positioned in said air flow passageway, said throttle valve being secured to said throttle shaft member and rotatable therewith; and a plunger mechanism positioned in said housing and having a spring biased plunger member and a plunger housing, said plunger member being positioned to engage and apply a biasing force against said stop shoulder on said first gear member during a portion of the range of rotation of said first gear member, said plunger member having a longitudinal axis and a range of travel relative to said plunger housing;

said plunger member being moved throughout said range of travel during normal operation of said electronic valve control assembly and rotation of said throttle valve;

said stop shoulder being positioned substantially perpendicular to said longitudinal axis of said plunger member at a point in the range of travel of said plunger member;

wherein friction between and wear of said stop shoulder and plunger member are reduced, and wherein deflection of said first gear member is reduced.

2. The electronic valve control assembly as set forth in claim 1 wherein said throttle valve is in a closed position in said air flow passageway when said plunger member is forced into said plunger housing and at one end of its range of travel and at a failsafe position when said plunger member is fully extended from said plunger housing and at the other end of its range of travel.

3. The electronic valve control assembly as set forth in claim 1 wherein said throttle valve is rotatable between a first position substantially transverse to the air flow passageway restricting the flow of air therethrough, a second position substantially parallel to the air flow passageway allowing a full complement of air therethrough, and a third failsafe position between said first and second positions.

4. The electronic valve control assembly as set forth in claim 3 further comprising a spring member positioned in said housing and biasing said first gear member towards said first position of said throttle valve.

5. The electronic valve control assembly as set forth in claim 3 wherein said plunger member biases said first gear member towards said third position of said throttle valve.

6. The electronic valve control assembly as set forth in claim 1 wherein said point in the range of travel of said plunger member is in said range of travel between said one end and said other end.

* * * * *